Feb. 14, 1961  S. M. SILVERMAN ET AL  2,971,331
AIRCRAFT AIR INLET SYSTEM
Filed Aug. 4, 1959
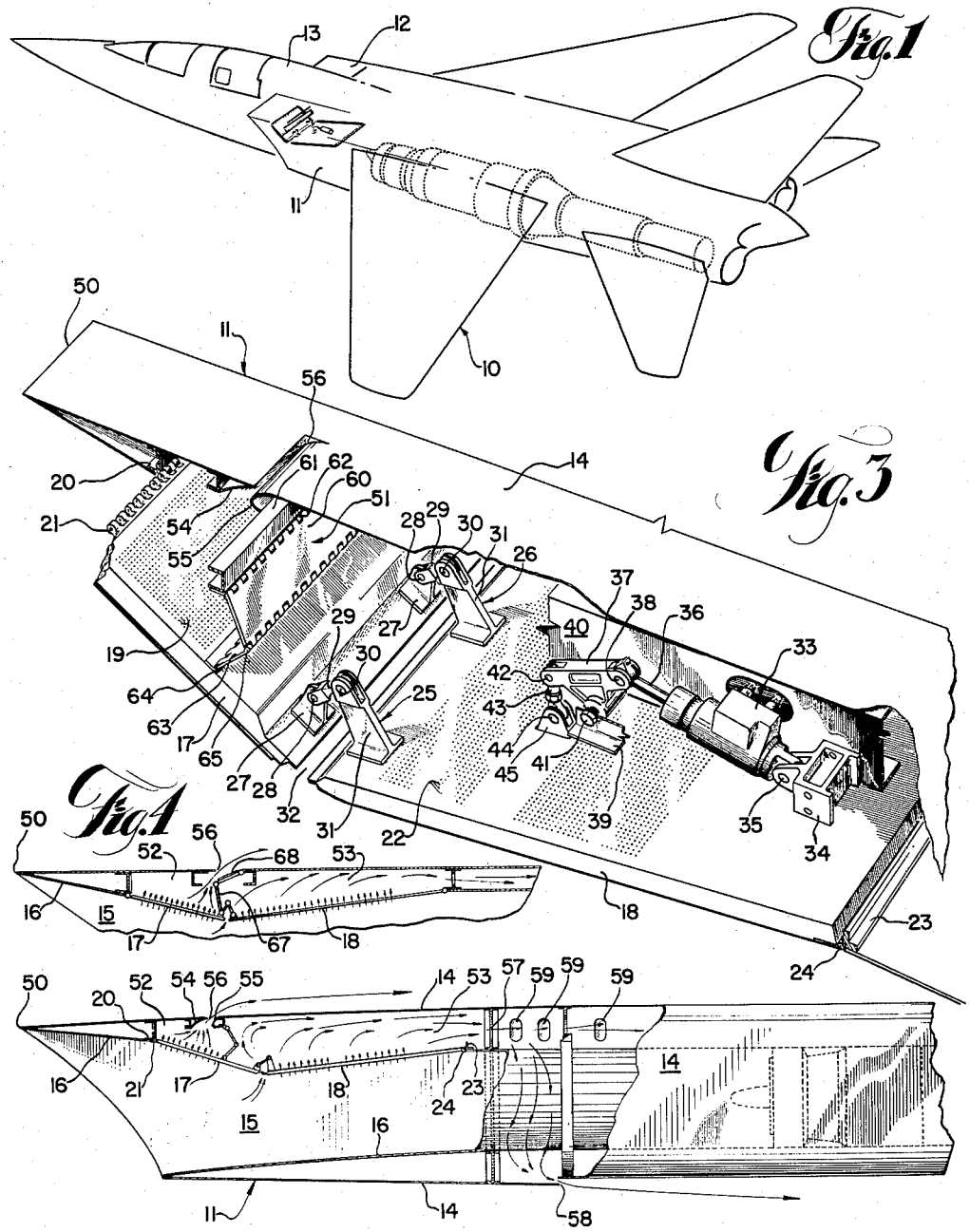
INVENTORS
STEPHEN M. SILVERMAN
LESTER W. THRONDSON
BY
ATTORNEY

United States Patent Office 2,971,331
Patented Feb. 14, 1961

1

2,971,331
AIRCRAFT AIR INLET SYSTEM

Stephen M. Silverman, Columbus, and Lester W. Throndson, Westerville, Ohio, assignors to North American Aviation, Inc.

Filed Aug. 4, 1959, Ser. No. 831,660
12 Claims. (Cl. 60—35.6)

This invention relates to an inlet system for supplying air to an aircraft engine, and particularly concerns an improved air inlet duct bleed arrangement which is effective to obtain an increase in aircraft performance efficiency.

The system of our invention improves the air pressure recovery of engine air inlet ducts provided in supersonic-type aircraft by employing a separation means to minimize undesirable circulation of bleed air extracted from the porous ramps typically included therein.

It is an important object of this invention to provide an inlet duct system which may be advantageously utilized with engines installed in supersonic-type aircraft, and which is effective to compress free-stream air to a low Mach number value with minimum pressure loss to thereby improve aircraft performance efficiency.

Another object of this invention is to provide an aircraft air inlet system which will improve aircraft operating efficiencies without incurring increased drag penalties.

Another object of this invention is to provide an air inlet system for supersonic-type aircraft and having improved inlet stability and freedom from buzz over a comparatively large air mass flow range.

A still further object of our invention is to provide an air inlet system which incorporates fore and aft porous ramps with an arrangement for preventing the circulation of bleed air between such ramps.

Another object of this invention is to provide an air inlet system for supersonic-type aircraft which may be easily and economically manufactured, which may be readily maintained, and which offers a high degree of operational reliability.

Other objects and advantages of this invention will become apparent during consideration of the detailed description and drawings.

In the drawings:

Fig. 1 illustrates an airplane having our invention incorporated therein;

Fig. 2 is a sectional view of portions of an air inlet system incorporated in the airplane of Fig. 1;

Fig. 3 is a perspective view showing additional details of the air inlet system shown in Fig. 2; and Fig. 4 is a sectional view illustrating an alternate embodiment of an air inlet system having features of this invention.

Fig. 1 illustrates a supersonic-type airplane 10 having air inlet systems located at 11 and 12. Each inlet system is essentially an open-ended duct arrangement carried by the fuselage portion 13 of the airplane and provided to supply operating air to an interiorly-located power plant. In Fig. 1, inlet system 11 is combined with the turbojet-type aircraft engine illustrated in phantom lines. Inlet system 12 is, in the Fig. 1 airplane, combined with a separate power plant unit.

The exterior of each air inlet system is defined in part by a cowling 14. The interior duct 15 of each inlet system is defined by the surfaces designated 16 and by the interior porous ramps 17 and 18. Referring to Figs. 2 and 3, fore porous ramp 17 includes the bleed perforations designated 19 and is attached to structural member 20 through the piano hinge type pivot means 21. Aft porous ramp 18 includes the bleed perforations 22 and is attached to structural member 23 through a pivot means 24 that is similar to pivot means 21. Ramps 17 and 18 are connected to each other by the connector means referenced generally as 25 and 26. Each connector means is comprised of a bracket 27 secured to fore ramp 17, a pivot pin 28, a link 29, a pivot pin 30, and a bracket 31 attached to ramp 18. Pivot pin 28 connects bracket 27 to link 29, and pivot pin 30 connects link 29 to bracket 31. Thus, when ramp 18 is pivoted about the axis of pivot means 24, connector means 25 and 26 cause ramp 17 to be pivoted about the axis of pivot means 21. In their extended position, a bleed gap 32 extends intermediate ramps 17 and 18.

The actuator means designated 33 is provided for causing simultaneous movement of ramps 17 and 18. Such actuator means is preferably of the double-acting, hydraulic type and has its body portion connected to structural support 34 by pivot means 35. The actuator means also includes the extendible and retractable piston rod portion 36 which is connected to bellcrank 37 by the pivot means designated 38. Bellcrank 37 is connected to rigid structural elements 39 and 40 by the pivot means designated 41. One arm portion of bellcrank 37 is connected to ramp 18 by pivot means 42, adjustable link 43, pivot means 44, and the bracket 45. Bracket 45 may be attached to ramp 18 by any suitable method. Thus, when rod portion 36 is extended with respect to the body portion of actuator unit 33, bellcrank 37 rotates counter-clockwise (Fig. 3) about pivot means 41 to cause ramp 18 to be moved downwardly and counter-clockwise about pivot means 24. Retraction of rod 36 causes rotation of bellcrank 37 and rotation of ramp 18 in an opposite manner. Simultaneous counter-rotation of ramp 17 about pivot 21 is achieved through the heretofore described connectors 25 and 26.

In a typical variable geometry air inlet system utilizing movable ramps and operating at supersonic velocities, an oblique shock wave emanates from the cowl lip designated 50. A boundary layer is simultaneously developed along the compression surface of the duct inlet, commencing in the region intermediate lip 50 and pivot means 21. An additional oblique shock wave is developed at and emanates from the region of the forward edge of ramp 17 (adjacent pivot means 21). A somewhat greater static pressure gradient is developed across this second oblique shock wave and a boundary layer of increasing thickness is developed along the interior duct compression surface portion defined by the underside of ramp 17. However, perforations 19 are incorporated into ramp 17 to reduce such boundary layer to thus improve duct performance by increasing compressor face total pressure and decreasing compressor face distortion, each for the jet engine, combined therewith.

The variable geometry inlet 11 of Figs. 1–3 also develops a normally oriented shock wave which emanates from the region adjacent the juncture of ramps 17 and 18 (gap 32). A comparatively great static pressure gradient is developed across such normal shock wave. Additionally, a boundary layer is normally developed along the under surface of ramp 18. However, this particular boundary layer is preferably kept to a minimum by bleeding duct air from the under surface of ramp 18 through performations 22.

The pressure conditions developed immediately adjacent the under surfaces of ramps 17 and 18 differ materially in magnitude. As a result, air bled through a comparable ramp 18 in a conventional inlet system is caused to circulate into the region of ramp 17 and be drawn into the inlet duct. The effect of such circulation is believed to include a reinforcing of an air constriction located adjacent gap 32 and in the vicinity of the normal shock wave to thereby unnecessarily reduce the air inlet system performance efficiency. We have discovered that the performance efficiency of an air inlet system can be materially increased by including therein a suitable separation means which prevents such recirculation of bleed air. A preferred form of separation means is illustrated in Fig. 2 and Fig. 3. An alternate arrangement is shown in Fig. 4.

As illustrated in Figs. 2 and 3, we advocate the use of the articulated hinged plate means referenced generally as 51 to achieve the separation function by establishing separate bleed air chambers 52 and 53. Separation means 51 includes a first plate portion 60 attached to structural member 61 by the piano hinge type pivot means designated 62. A lower plate portion 63 is connected to ramp 17 by a similar pivot means designated 64. Pivot means 65 serves to connect plate portions 60 and 63 to each other.

First bleed air chamber 52 is therefore defined by part of ramp 17, by separation means 51, and by a portion of cowling 14, and by member 20. An overboard dump opening 56 is provided in combination with chamber 52 and is partially defined by the fairings designated 54 and 55. Chamber 53 is defined, in part, by ramp 18, by separation means 51, and by a portion of exterior cowling 14. In the specific embodiment shown in Figs. 2 and 3, chamber 53 is partially defined by an imperforate portion of ramp 17. Bleed air extracted through ramp 18 and through gap 32 is passed through openings 57 and 58 to the exterior of the airplane. If desired, a portion of the air bled therethrough may be passed through openings 59 to the fuselage interior for exhaust ventilation purposes. The pressure communication established between chambers 52 and 53 and the atmosphere, as through openings 56 through 58, establishes a pressure gradient with respect to the interior of duct 14 to thereby cause air to be bled from duct 14 through perforation groupings 19 and 22 and through gap means 32.

The arrangement of Figs. 2 and 3 is particularly effective for bleeding air from ramps 17 during periods of subsonic and supersonic aircraft operation. However, if it is desired to bleed air from ramp 17 only during periods of supersonic aircraft operation, the arrangement of Fig. 4 may be utilized. As illustrated therein, the separation means 51 is comprised of plate portions 67 and 68. Plate portion 68 is provided with an upper contour which conforms to and registers with the opening 56 of cowling 14 when ramp 17 is moved to its fully retracted position. In the ramp-extended position of Fig. 4, a bleed pressure condition is established in chamber 52. Chamber portions 52 and 53 of the Fig. 4 embodiment each communicate with the exterior of the airplane through an appropriate passageway (for example, opening 56). As with the arrangement of Figs. 2 and 3, such passageways are utilized to achieve interior low-pressure conditions within the separated bleed air chambers during flight to accomplish the withdrawal of boundary layer air from the duct interior. However, in the Fig. 4 system opening 56 is closed by plate portion 68 during subsonic aircraft operation to thereby effect boundary layer air bleeding only with respect to ramp 18.

This invention should also find application with respect to inlet duct arrangements proposed for future-generation aircraft having speed capabilities in excess of approximately mach number 2.0. Such inlet systems are expected to include a series of porous ramps rather than the dual ramp arrangement illustrated in the drawings. In such an arrangement it is preferred that a suitable separation means be provided essentially intermediate each ramp of each pair of immediately-adjacent ramps. Each ramp in the series would then partially define a separate bleed air chamber similar to chamber portions 52 and 53. Such separate chambers would each communicate with an appropriate low-pressure region such as the airplane exterior.

It is to be understood that the form of the invention herewith shown and described is to be taken as the preferred embodiment of the same, but that various changes in the shape, size, and arrangement of parts may be resorted to without departing from the spirit of the invention or the scope of the subjoined claims.

We claim:

1. An aircraft engine air inlet system which includes: a converging-diverging duct, a fore porous ramp partially defining a converging part of said duct, an aft porous ramp located adjacent said fore porous ramp and partially defining a diverging part of said duct, a first bleed air chamber positioned outside said duct and defined in part by said fore porous ramp, and a second bleed air chamber positioned outside said duct and defined in part by said aft porous ramp, said bleed air chambers being separated from each other whereby air bled from within said duct and through said aft porous ramp is prevented from circulating through said fore porous ramp.

2. In combination with an aircraft engine: an inlet air system provided with a duct, a fore porous ramp comprising a part of said duct portion having a portion which develops an air flow shock system, an aft porous ramp comprising another part of said duct portion and located adjacent said fore porous ramp, a cowling means located exterior to said duct portion to partially define a bleed chamber region outside said duct portion, and separation means extended intermediate said cowling means and said air duct portion and across said bleed chamber region, said separation means establishing separate bleed air chamber portions within said region and preventing air circulation between said porous ramps to thereby improve the air pressure recovery capability of said duct portion during supersonic operation.

3. The combination defined in claim 2, wherein said separation means is movable relative to said cowling means, said separation means being connected to and moved by said fore porous ramp when said fore porous ramp is moved relative to said cowling means.

4. In an aircraft engine inlet having movably joined porous ramps which control a shock wave system and boundary layer air removal operation of the aircraft engine at supersonic velocities, in combination, a first bleed air chamber for extracting air from an interior duct through one of said ramps, and a second bleed air chamber for extracting bleed air from an interior duct through the other of said ramps, said second bleed air chamber being separated from said first bleed chamber in air-conducting relation.

5. A supersonic-type aircraft air inlet system having a duct, a normal shock wave region interior of and extended across said duct, a first bleed air chamber outside said duct and communicating with said duct forward of said shock region, and a second bleed air chamber outside said duct and communicating with said duct afterward of said shock region, said bleed air chambers being separated from each other whereby air bled from within said duct afterward of said shock region is not conducted into said duct through said first bleed air chamber.

6. The inlet system defined in claim 5, wherein an extendible and retractable and substantially impervious separation means is provided exterior to said duct, said separation means being positioned intermediate said bleed air chambers to thereby separate such chambers from each other.

7. An air inlet system for supersonic-type aircraft, including: a duct, a fore porous ramp comprising a movable surface portion of said duct, an aft porous ramp comprising another movable surface portion of said duct, a first bleed air chamber communicating with said duct through said fore porous ramp, a second bleed air chamber communicating with said duct through said aft porous ramp, and separation means outside said duct and separating said bleed air chambers from each other in air transfer relation, said fore and aft porous ramps being located in controlling relation to an airflow shock wave region in said duct and separated by a gap means which communicates with said second bleed air chamber.

8. The inlet system defined in claim 7, wherein separation means is movable with respect to said system, said separation means being pivotally connected to said fore porous ramp whereby said separation means is moved when said fore porous ramp is moved.

9. The inlet system defined in claim 7, wherein said separation means is comprised of hingedly-connected plate members, one of said plate members being pivotally connected to said fore porous ramp.

10. An engine duct inlet system which includes: a duct, a movable, porous ramp means defining a part of said duct, separated bleed air chambers outside said duct and partially defined by said porous ramp means, an opening associated with one of said bleed air chambers for venting bled boundary layer air therefrom, and a separation means separating said bleed air chambers from each other, said separation means having a surface portion which conforms to and which registers with said opening when said porous ramp means is moved to a retracted position.

11. The system defined in claim 10, wherein said separation means is comprised of hingedly-connected, plate-like members, one of said members being connected to said porous ramp means and another of said plate-like members having said conforming surface portion contained therein.

12. In an engine duct inlet system for aircraft and the like, in combination: a duct, porous ramps defining a part of said duct, a bleed air region outside said duct but adjacent said ramps and having internal pressure zones of different pressure magnitudes, and separation means dividing said bleed air region into individual bleed air chambers which are isolated from each other in air transfer relation, said separation means being located in said region to separate said pressure zones and in a manner whereby said porous ramps each partially define one of said individual bleed air chambers.

References Cited in the file of this patent

UNITED STATES PATENTS

| | | |
|---|---|---|
| 2,589,945 | Leduc | Mar. 18, 1952 |
| 2,840,322 | Griffith | June 24, 1958 |
| 2,877,965 | Wakefield | Mar. 17, 1959 |

FOREIGN PATENTS

| | | |
|---|---|---|
| 747,705 | Great Britain | Apr. 11, 1956 |

# UNITED STATES PATENT OFFICE
CERTIFICATE OF CORRECTION

Patent No. 2,971,331            February 14, 1961

Stephen M. Silverman et al.

It is hereby certified that error appears in the above numbered patent requiring correction and that the said Letters Patent should read as corrected below.

Column 4, lines 27 and 28, strike out "having a portion which develops an air flow shock system" and insert the same after "duct" in line 26, same column.

Signed and sealed this 26th day of December 1961.

(SEAL)
Attest:

ERNEST W. SWIDER
Attesting Officer

DAVID L. LADD
Commissioner of Patents

USCOMM-DC